United States Patent
Münzenberger et al.

[11] Patent Number: 6,161,873
[45] Date of Patent: Dec. 19, 2000

[54] MASONRY LEAD-IN FIXTURE

[75] Inventors: Herbert Münzenberger, Wiesbaden; Arndt Andresen, Landsberg/Lech, both of Germany; Jean-Louis Milhes, Feldkirch, Austria

[73] Assignee: Hilti Aktiengesellschaft, Schaan, Liechtenstein

[21] Appl. No.: 09/251,122

[22] Filed: Feb. 16, 1999

[30] Foreign Application Priority Data

Feb. 16, 1998 [DE] Germany ............................ 198 06 012

[51] Int. Cl.⁷ ............................. F16L 35/00; F16L 37/00
[52] U.S. Cl. ........................................ 285/3; 285/4
[58] Field of Search .................................. 285/3, 4

[56] References Cited

U.S. PATENT DOCUMENTS

| | | | |
|---|---|---|---|
| 4,109,423 | 8/1978 | Perrain | 52/1 |
| 4,894,966 | 1/1990 | Bailey et al. | 52/317 |
| 5,452,551 | 9/1995 | Charland et al. | 52/232 |
| 5,456,050 | 10/1995 | Ward | 52/220.8 |
| 5,548,934 | 8/1996 | Israelson | 52/473 |

*Primary Examiner*—Lynne H. Browne
*Assistant Examiner*—Aaron Dunwoody
*Attorney, Agent, or Firm*—Brown & Wood, LLP

[57] ABSTRACT

A masonry lead-in fixture having a housing (2; 102) including an axially extending through bore (10; 110), a radially protruding attachment flange (4; 104) provided at least at one end of the housing (2; 102), and a mass (11; 111) intumescible in case of a fire, with the mass (11, 111) limiting the bore (10; 110) at least regionwise and closing the bore (10; 110) upon being intumesced, and a substantially disc-shaped partition (12; 112) located in the housing (2; 102) and which elastically and springy extends over an entire inner diameter of the bore (10, 110) and has a predetermined breaking area which is broken through upon pipe cable or the like being pushed therethrough.

9 Claims, 2 Drawing Sheets

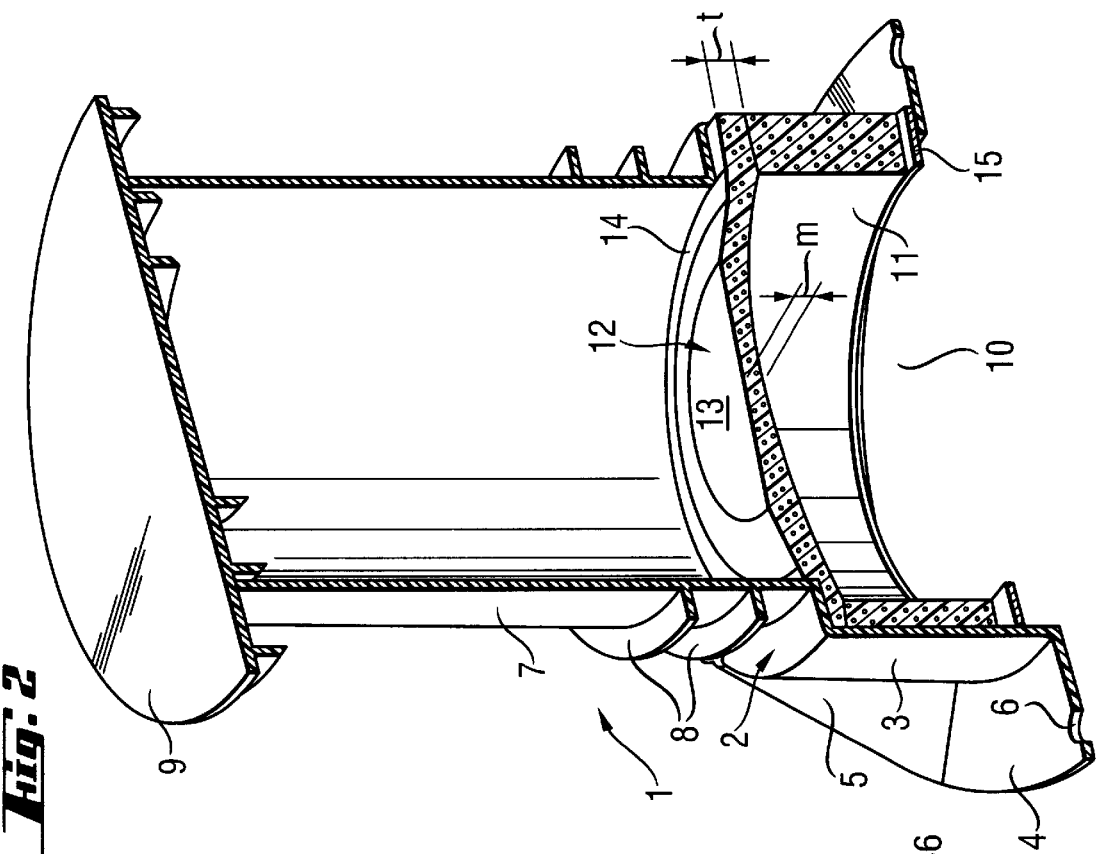
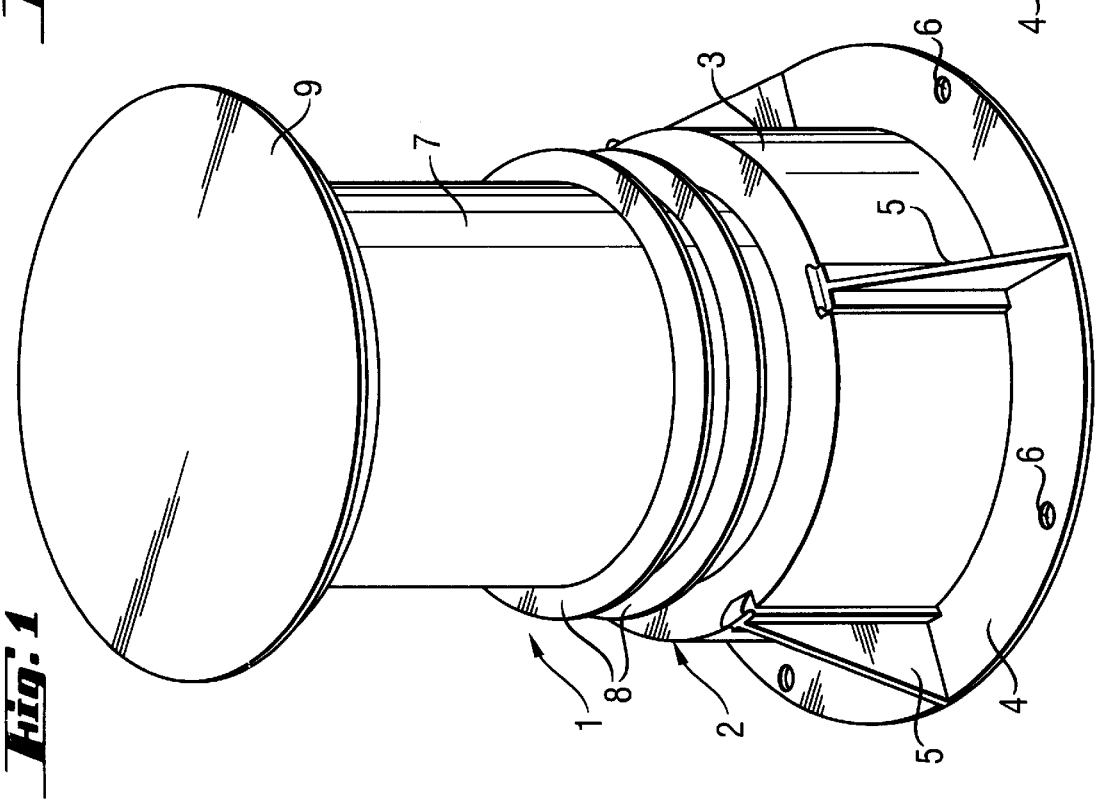

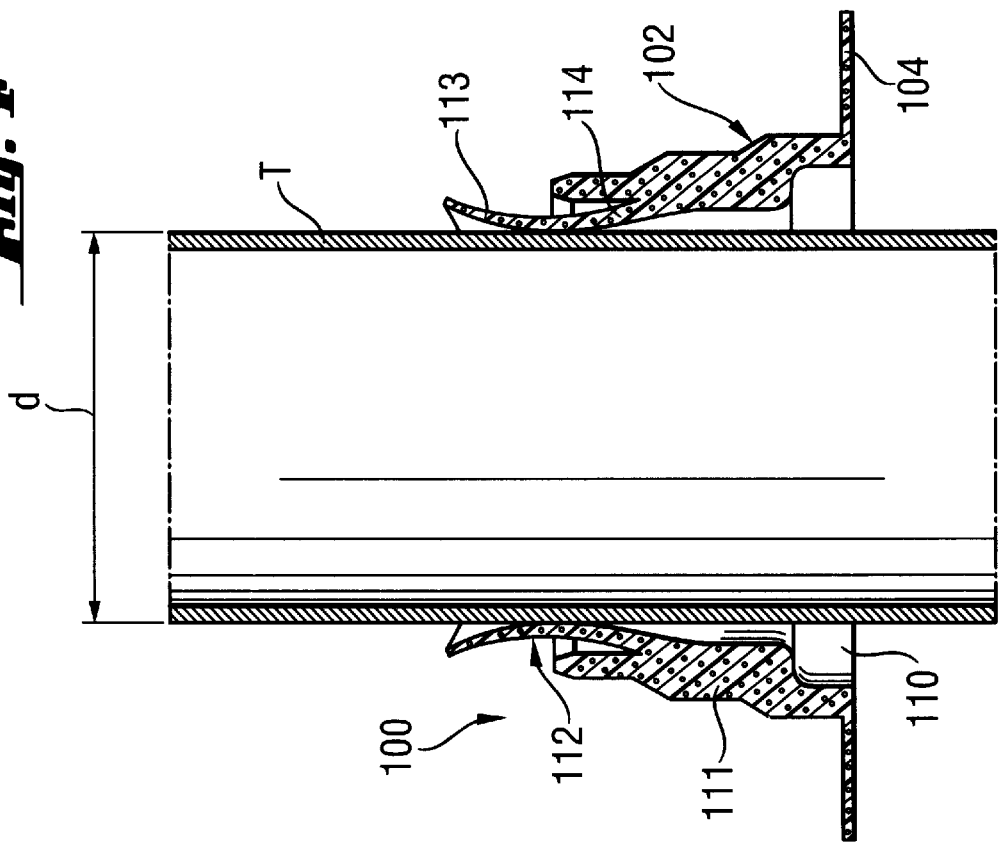
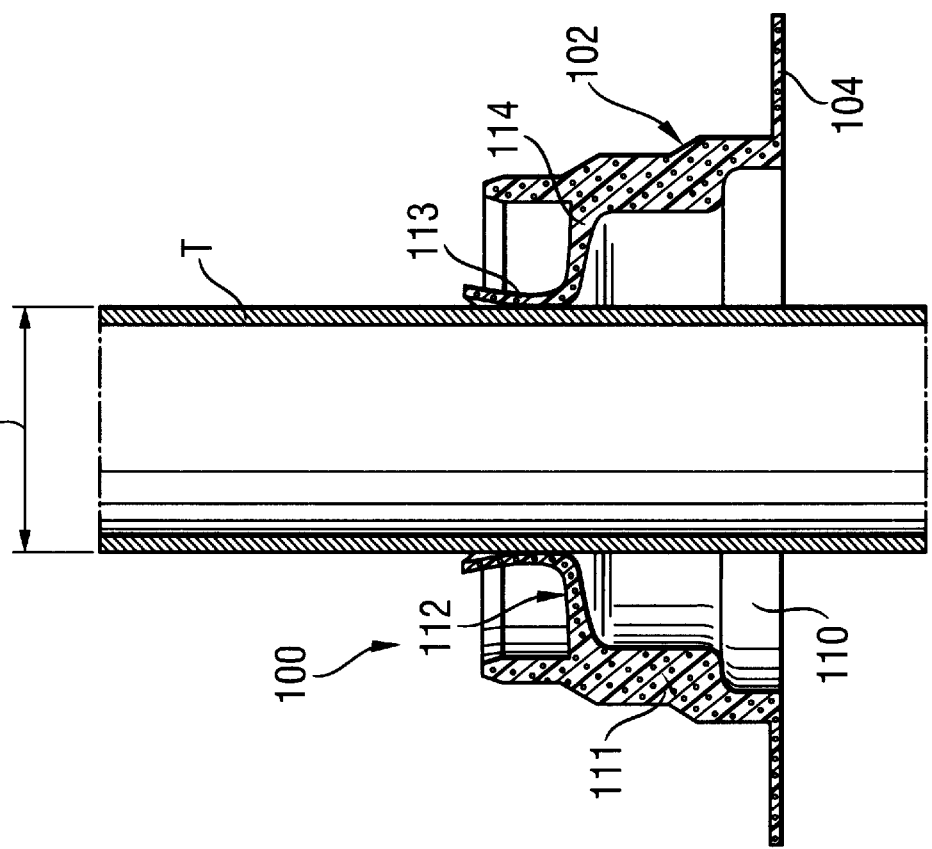

MASONRY LEAD-IN FIXTURE

BACKGROUND OF THE INVENTION

1. Field of the Invention

The present invention relates to a fire-retarding masonry lead-in fixture for cables, pipes and the like and having a housing including an axially extending through-bore, a radially protruding attachment flange provided at least at one end of the housing, and a mass intumescible in case of fire, with the mass limiting the bore at least regionwise and closing the bore upon being intumesced.

2. Description of the Prior Art

When planning and erecting buildings, in many cases, masonry lead-ins are left in walls and floors through which only in a later constructional phase or upon further development, pipes, cables and the like can be inserted. In this way, damage of the pipes, cables and the like in earlier constructional phases is prevented. To form, e.g., a masonry lead-in in a floor, already during the formwork work, a tubular fixture with a desired inner diameter, which serves as space retainer, is secured to the formwork and then is cast-in together with the concrete floor. The space retainer remains in the concrete floor and usually slightly projects above the floor at one side of the floor. However, the left lead-ins present a danger in case of a fire, facilitating its spread. Therefore, precautions should be taken to prevent the spread of fire through such lead-ins for a predetermined minimal period. To this end, the tubular fixtures includes primarily a fire-retarding mass which intumsces in case of a fire and, upon expansion, closes the lead-in. With an inserted combustible plastic pipe, the intumscent mass prevents the spread of fire through the pipe by crushing and closing the pipe upon being expanded.

For pipes, cables and the like having different outer diameters, respective tubular fixtures with corresponding inner diameters are provided as space retainers. Because dependent on a country, for a predetermined nominal diameter of a pipe, the effective outer diameters differ from country to country, it should be clear that a large number of lead-in fixtures with respective different diameters would be required for a pipe with the same nominal diameter. Furthermore, the inner diameters of tubular fixtures do not exactly correspond to the outer diameters of inserted pipes, cables and the like. Therefore, upon insertion, e.g., of a pipe, a more or less wide annular gap usually remains between the outer wall of the pipe and the inner wall of the fixture. It may also happen that a pipe or cable, which has a smaller diameter than that permitted by a fixture, is inserted through the fixture. The remaining gap enables an unhindered penetration of a smoke generated during a fire until the lead-in is closed with the intumescible mass. Therefore, with the conventional fixtures, the annular gap formed after the insertion of a pipe, cable and the like need be closed by using additional means. The gap is usually closed with mineral wool, mortar mass, a special sealing compound and the like. The expenses associated with the sealing of the gap increases with increased widths of the gap. Moreover, a substantially axial alignment of a pipe within the fixture becomes more difficult and is done with additional expenditure of time and labor. In the case when a lead-in in a wall or a floor is formed preliminary to a subsequent insertion of a pipe, cable or the like, which is effected in a later constructional phase, a conventional fixture requires a separate closure or cover for smoketight closing of the bore to a most possible extent.

Accordingly, an object of the present invention is a fire-retarding masonry lead-in fixture for pipes, cables and the like in which the drawbacks of the prior art are eliminated. The fixture should serve as a space retainer during the formation of a lead-in and have a greater flexibility with regard to the outer diameters of the insertable pipes, cables and the like. In addition, the fixture should insure an adequate smoke retardation, without any additional sealing, until the lead-in is closed with the intumesced-by-fire mass. It should be possible to eliminate additional smoketight closures or covers.

SUMMARY OF THE INVENTION

These and other objects of the present invention, which will become apparent hereinafter are achieved by providing a substantially disc-shaped partition located in the housing and which elastically and springy extends over the entire inner diameter of the housing opening and has a predetermined breaking area which is broken through upon a pipe, cable or the like being pushed through the partition.

The partition, which is located in the axial through-bore of the fixture housings, forms a barrier for a fire-generated smoke. When the lead-in is formed in a wall or a floor in advance, and a pipe, cable, or the like has not been inserted, the housing through-bore remains closed. Providing of a predetermined breaking area in the substantially disc-shaped partition provides for an easy insertion of a pipe, cable and the like when necessary. The elasticity of the partition insures that the edges of the opening, which is formed in the partition upon an insertion of a pipe, cable and the like, are pressed against the outer wall of the inserted element with a preload. Thereby, even with an inserted pipe, cable or the like, smoke retardation is insured so that an adequate protection against smoke penetration becomes available until the housing opening is closed by the intumesced mass.

For constructional and functional reasons, it proved to be advantageous when the partition is arranged in the vicinity of the intumescent mass. The constructive advantages of this consists in that when the fixture is formed of several parts, the separate parts can be fixed with a common locking or retaining ring. The functional advantage consists in that for the retardation of fire and the resulting smoke, all relevant elements of the fixture are subjected approximately to the same conditions.

Advantageously, the predetermined breaking area is formed in the center region of the partition. This insures that upon the insertion of a pipe, cable or the like in the fixture, which serves as a space retainer, the partition becomes broken through in the center region. As a result of the elasticity of the partition, an automatic centering of the inserted pipe, cable or the like takes place. Due to the centering of the inserted pipe, cable and the like, the edges of the opening formed in the partition are arranged uniformly over the entire circumference of the pipe, cable and the like and, thereby, insure a smoke-retarding action along the entire circumference of the pipe, cable, and the like. A further advantage consists in that with an insertion of a thin pipe or cable, the partition is broken through only in a small area of the center region. This makes possible to insert, if necessary, at a later time, a pipe or cable with a larger diameter through the already formed opening, without loosing the smoke-retarding action.

According to an embodiment of the present invention, the partition is formed of an elastic film which, advantageously, is covered with aluminum. The film is weakened in the central region and has, outside of the weakened region, a wall thickness which amounts from about 1 mm to about 2.5 m. The film has the necessary smoke-retarding characteristics and, in case it is covered with aluminum, provides also for fire retardation. Due to its flexibility, the film adapts very well to the circumference of an inserted pipe, cable or the like.

In an alternative embodiment of the invention, the partition is formed as a disc of a foam material, e.g., flexible foam polyurethane. A disc of a foam material has an inherit elasticity. Thereby, the edge of the opening, which is formed in the partition upon the insertion of a pipe, cable and the like, is pressed against the outer surface of the pipe, cable or the like and adequately seals the lead-in against a fire-generated smoke.

The disc of the foam material has a substantially concave cross-section. The center region, which forms the predetermined breaking area, has a wall thickness amounting from about 2 mm to about 15 mm, preferably, about 5 mm. The edge, which adjoins the housing, has a wall thickness from about 5 mm to about 30 mm, preferably, about 20 mm. The selected thickness insures that the disc is broken through simply by the insertion of pipe, cable or the like, without a need in application of excessive forces. A relatively large increase of the thickness from the predetermined breaking area in the center region of the disc to the disc edge insures that the break-through is effected only in the central region.

According to an advantageous embodiment of the present invention, the fixture housing and, if necessary, the partition are formed of an intumescent material. The fixture of this embodiment has no jacket enveloping the intumescent mass which would have concentrated the expansion pressure of the intumesced mass in case of fire. The jacket is formed by the surrounding masonry of floor. If the partition is likewise formed of intumescent mass, the smoke retarding action increases upon the mass expansion, and the partition contributes to the fire-retarding closing of the through-bore of the housing. From the manufacturing point of view, it is advantageous to form the housing and the partition as a one-piece part.

In an alternative embodiment, the housing has a substantially tubular jacket, which preferably is formed of plastics and in the interior of which, the intumescent mass and the partition are retained without a possibility of being lost. In case of a fire, the jacket concentrate the expansion pressure of the intumescent mass. Advantageously, the partition and the intumescent mass are formed as a one-piece component. This is advantageous from the manufacturing point of view. Further, means necessary for retaining the partition inside the jacket can be eliminated.

BRIEF DESCRIPTION OF THE DRAWINGS

The feature and objects of the present invention will become more apparent, and the invention itself will be best understood from the following detailed description of the preferred embodiments when read with reference to the accompanying drawings, wherein:

FIG. 1. shows a perspective view of a first embodiment of a masonry lead-in fixture according to the present invention;

FIG. 2. shows an axially cut-off view of the fixture shown in FIG. 1; and

FIGS. 3&4 show each a perspective view of a second embodiment of a fixture according to the present invention with pipes having different diameters extending through the fixture.

DESCRIPTION OF THE PREFERRED EMBODIMENT

A masonry lead-in fixture, a first embodiment of which is shown in FIGS. 1–2, is designated generally with a reference numeral 1. It includes a tubular housing 2 with a jacket 3 advantageously formed of a plastic material. A radially protruding flange 4 is formed at one of the longitudinal ends of the jacket 3. In the flange 4, there are provided holes 6 for securing the fixture 1 to a support, e.g., to a formwork for a floor, with screws or nails. Wings 5, which extend from the jacket 3 to the flange 4, impart to the housing the necessary stiffness and prevent, in a cast-in condition, rotation of the fixture relative to the concrete floor after the formwork has been removed. At the end of the housing 2, opposite to the flange 4, an axially extending lengthening pipe 7 can be provided. The lengthening pipe 7 can be made as one piece with the jacket 3. The lengthening pipe 7 is usually formed from a plastic material so that it can be easily cut-off to a desired length, if necessary. The lengthening pipe 7 projects, in the cast-in condition of the fixture 1, e.g., by about 10 cm above the concrete floor. In case of a water pipe break, this prevents penetration of the water into the fixture 1 and from there in the space under the floor. Radial circumferential ribs 8 serve, particularly during vertical mounting, as loss-preventing means for the cast-in-the concrete fixture. A cover 9, which does not need be necessarily gastight, serves precautionally primarily as a screen for the fixture 1 mounted in a wall or a floor. The cover 9 prevents the concrete from penetrating into the fixture 1, which is mounted in a formwork, during casting of a concrete floor.

within the jacket 2, an intumescent mass 11 is provided. It has a shape of a ring and limits the bore 10 in the housing 2. In the immediate vicinity of the ring of the intumescent mass 11, there is provided a partition 12 which closes the bore 10. The intumescent mass ring 11 and the partition 12 lie on a shoulder of the housing 2 and are retained in a predetermined position by a locking ring 15. The partition 12 has a shape of a concave disc. The disc-shaped partition 12 is formed, advantageously, of a flexible foam polyurethane. The center region 13 of the disc-shaped partition 12 is formed as a predetermined breaking area and has a thickness which amounts to from about 2 mm to about 15 mm, preferably, about 5 mm. In the edge region 14, the disc-shaped partition 12 has a thickness t which amounts from about 5 mm to about 30 mm, preferably 20 mm. As shown, the partition 12 can be formed as a separate component. However, it can also be made as one-piece with the ring 11. In this case, in case of fire, the partition 12 contributes to a complete closure of a plastic pipe that has been pushed through. Instead of a disc-shaped partition 12 of a foam material which, in addition, can have fire-retarding characteristics, it is also possible to form the partition of a plastic film. When a plastic film is used, the center area is weakened, and the thickness of the film outside of the predetermined breaking area is from about 1 mm to about 2.5 mm. To improve the fire protection characteristics of the film, the film can be covered with metal, e.g., aluminum.

FIGS. 3 and 4 show another embodiment of a masonry lead-in fixture according to the present invention, which is designated generally with a reference numeral 100. The design of the fixture 100 is substantially simplified in comparison with the first embodiment of the fixture shown in FIGS. 1–2. The fixture 100 has no jacket for receiving the intumescent mass and no separate partition. Rather, the housing 102 is formed of an intumescent mass 111 and has flanges 104 formed of the intumescent mass. The partition 112, which cover the bore 110, as shown, is formed integrally with the housing 102 and is also formed of the intumescent mass. The partition 112 has substantially a concave cross-section with a thicker edge region 114 and a predetermined breaking central area 113.

FIG. 3 shows the fixture 100 with a pipe t extending therethrough. The pipe t has a comparatively small outer diameter d. The partition 112 is simply punctured in the central area 113. The edges of the partition 112, due to the inherit elasticity of the material, lie on the outer surface of the pipe t and insure, in case of a fire, an adequate smoke retardation.

FIG. 4 shows the fixture 100 with a pipe t extending therethrough, with the pipe diameter d being substantially greater and corresponding to a largest possible diameter of a pipe which can extend through the fixture 100. The partition 112 is widely open in this case. Due to the elasticity of the partition 112, the edge of the petition opening lies on the outer surface of the pipe t' and is pressed against it. Thereby, the annular gap between the pipe t and the inner wall of the fixture 100 is adequately closed. Thereby, the penetration of smoke, which is generated in case of a fire, is delayed at least for a time until the bore 110 of the fixture 100 or the pipe t is closed by the expandable intumescent mass. Though the present invention was shown and described with reference to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A masonry lead-in fixture, comprising a housing (2; 102) including an axially extending through-bore (10; 110); a radially protruding attachment flange (4; 104) provided at least at one end of the housing (2, 102), and a mass (11, 111) intumescible in case of a fire, the mass (11; 111) limiting the bore (10, 110) at least partially and closing the bore (10, 110) upon being intumesced; and a substantially disc-shaped partition (12; 112) located in the housing (2; 102), elastically extending over an entire inner diameter of the bore (10; 110), and having a predetermined breaking area which is broken through upon an insertion element (T) being pushed therethrough,
   wherein the partition (12; 112) comprises a film which is weakened in a center region (13; 113) thereof and has, outside of the weakened region (13, 113), a thickness which amounts to from about 1 mm to about 2.5 mm.

2. A fixture according to claim 1, wherein the film is covered with aluminum.

3. A masonry lead-in fixture, comprising a housing (2; 102) including an axially extending through-bore (10; 110), a radially protruding attachment flange (4, 104) provided at least at one end of the housing (2, 102), and a mass (11, 111) intumescible in case of a fire, the mass (11; 111) limiting the bore (10; 110) at least partially and closing the bore (10; 110) upon being intumesced; and a substantially disc-shaped partition (12, 112) located in the housing (2; 102); elastically extending over an entire inner diameter of the bore (10; 110); and having a predetermined breaking area which is broken through upon an insertion element (T) being pushed therethrough,
   wherein the partition (12; 112) is formed of a disc of a foam material; and
   wherein the disc (6) has a substantially concave cross-section having a center region (13) a wall thickness (m) of which amounts from about 2 mm to about 15 mm, and an edge (14) adjoining the housing (2) and a wall thickness (t) of which amounts to from about 5 mm to about 30 mm.

4. A fixture according to claim 3, wherein the foam material is flexible foam polyurethane.

5. A fixture according to claim 3, wherein the wall thickness (m) of the center region (13) amounts to about 5 mm, and the wall thickness (t) of the edge (14) amounts to about 20 mm.

6. A masonry lead-in fixture, comprising a housing (2; 102) including an axially extending through-bore (10; 110), a radially protruding attachment flange (4; 104) provided at least at one of the housing (2; 102), and a mass (11, 111) intumescible in case of a fire, the mass (11; 111) limiting the bore (10; 110) at least partially closing the bore (10; 110) upon being intumesced; and a substantially disc-shaped partition (12, 112) located in the housing (2; 102), elastically extending over an entire inner diameter of the bore (10; 110), and having a predetermined breaking area which is broken through upon an insertion element (T) being pushed therethrough, wherein the housing (102) is formed of the intumescent mass (111).

7. A fixture according to claim 6, wherein the partition (110) is likewise formed of the intumescent mass.

8. A fixture according to claim 7, wherein the housing (102) and the partition (112) are formed as a one-piece part.

9. A fixture according to claim 7, wherein the partition is formed integrally with the intumescent mass.

\* \* \* \* \*